(12) United States Patent
Bajikar

(10) Patent No.: US 7,126,527 B1
(45) Date of Patent: Oct. 24, 2006

(54) METHOD AND APPARATUS FOR MOBILE DEVICE LOCATION VIA A NETWORK BASED LOCAL AREA AUGMENTATION SYSTEM

(75) Inventor: Sundeep Bajikar, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 591 days.

(21) Appl. No.: 09/603,451

(22) Filed: Jun. 23, 2000

(51) Int. Cl.
G01S 5/14 (2006.01)

(52) U.S. Cl. .............................. 342/357.02; 342/357.09
(58) Field of Classification Search ........... 342/357.09, 342/357.03, 457; 455/456.1; 701/213, 214, 701/215
See application file for complete search history.

(56) References Cited

U.S. PATENT DOCUMENTS

| | | | |
|---|---|---|---|
| 5,225,842 A | 7/1993 | Brown et al. | |
| 5,587,715 A * | 12/1996 | Lewis | 342/357.03 |
| 5,617,100 A * | 4/1997 | Akiyoshi et al. | 342/357.03 |
| 5,621,646 A * | 4/1997 | Enge et al. | 701/120 |
| 5,638,077 A * | 6/1997 | Martin | 342/357.03 |
| 5,764,184 A * | 6/1998 | Hatch et al. | 342/357.02 |
| 5,781,156 A | 7/1998 | Krasner | |
| 5,812,087 A | 9/1998 | Krasner | |
| 5,825,327 A | 10/1998 | Krasner | |
| 5,831,574 A | 11/1998 | Krasner | |
| 5,841,396 A | 11/1998 | Krasner | |
| 5,874,914 A | 2/1999 | Krasner | |
| 5,884,214 A | 3/1999 | Krasner | |
| 5,884,220 A | 3/1999 | Farmer et al. | |
| 5,890,068 A | 3/1999 | Fattouche et al. | |
| 5,899,957 A * | 5/1999 | Loomis | 701/214 |
| 5,913,170 A | 6/1999 | Wortham | |
| 5,926,133 A | 7/1999 | Green, Jr. | |
| 5,945,944 A | 8/1999 | Krasner | |
| 5,959,577 A | 9/1999 | Fan et al. | |
| 5,983,161 A | 11/1999 | Lemelson et al. | |
| 5,987,377 A | 11/1999 | Westerlage et al. | |
| 5,999,124 A | 12/1999 | Sheynblat | |
| 6,002,363 A | 12/1999 | Krasner | |
| 6,016,119 A | 1/2000 | Krasner | |
| 6,052,081 A | 4/2000 | Krasner | |
| 6,058,338 A | 5/2000 | Agashe et al. | |
| 6,061,018 A | 5/2000 | Sheynblat | |
| 6,064,336 A | 5/2000 | Krasner | |
| 6,064,339 A | 5/2000 | Wax et al. | |

(Continued)

FOREIGN PATENT DOCUMENTS

JP 6-3431 A * 1/1994

OTHER PUBLICATIONS

Kee et al, "Wide Area Differential GPS (WADGPS): Future Navigation System" IEEE Transactions on Aerospace and Electronic Systems, Apr. 1996, pp. 795-808.*

(Continued)

Primary Examiner—Gregory C. Issing
(74) Attorney, Agent, or Firm—Rahul D. Engineer

(57) ABSTRACT

Methods and apparatuses for mobile device location via a network based local area augmentation system. In one embodiment a plurality of base stations each has a known location. Each base station includes a positioning receiver to generate base station location information and a link to a network to transmit the base station location information. A correction information calculation module is coupled to the network to receive base station location information from each of the base stations via the network. The correction information calculation module calculates correction information as a function of the base station location information and the known location for all of the base stations.

26 Claims, 13 Drawing Sheets

U.S. PATENT DOCUMENTS

| | | | |
|---|---|---|---|
| 6,067,045 | A | 5/2000 | Castelloe et al. |
| 6,067,046 | A | 5/2000 | Nicholas |
| 6,067,484 | A | 5/2000 | Rowson et al. |
| 6,070,078 | A | 5/2000 | Camp, Jr. et al. |
| 6,107,960 | A | 8/2000 | Krasner |
| 6,215,441 | B1 * | 4/2001 | Moeglein et al. ...... 342/357.01 |
| 6,229,478 | B1 * | 5/2001 | Biacs et al. ............ 342/357.03 |

OTHER PUBLICATIONS

Batchelor et al, "Design Features of D-GNSS Reference Stations" 5th International Conf. on Satellite Systems for Mobile Communications and Navigation, May 1996, pp. 1-6.*

Samuel P. Pullen, et al., "A New Method for Coverage Prediction for the Wide Area Augmentation System (WAAS)", Department of Aeronautics and Astronautics Stanford University, pp. 1-13.

T. Walter, et al., Flight Trials for the Wide-Area Augmentation System (WAAS), Stanford University, Sep. 23, 1994.

H. Stewart, et al., "Precision Landing Tests with Improved Integrity Beacon Pseudolites", *Proceedings of ION GPS-95*, Palm Springs, CA., Sep. 1995.

David Lawrence, et al., "Performance Evaluation of On-Airport Local Area Augmentation System Architectures", *Proceedings of ION GPS-96*, Kansa City, MO., Sep. 17-20, 1996.

Boris Pervan, et al., "Flight Test Evaluation of a Prototype Local Area Augmentation System Architecture", *Proceedings of ION GPS-97*, Kansas City, MO., Sep. 1997.

John Warburton, et al., "Integration and Testing of a Wide-Band Airport Pseudolite", FAA William J. Hughes Technical Center, ACT-360, *Proceedings of ION GPS-99*, Sep. 14-17, 1999.

Sam Pullen, et al., "A Comprehensive Integrity Verification Architecture for On-Airport LAAS Category III Precsion Landing", *Proceedings of ION GPS-96*, Kansas City, MO., Sep. 17-20, 1996.

Boris S. Pervan, et al., "Development, Implementation, and Testing of a Prototype LAAS Architecture", Presented at GNSS-97 in Munich, Germany, Apr. 1997.

Mark Moeglein and Norman Krasner, "An Introduction to SnapTrack Server-Aided GPS Technology".

Holly Baker, "FAA and Industry Partners Advance New Satellite Technology", FAA William J. Hughes Technical Center News, Nov. 1, 1999, pp. 1-2, URL http://www.tc.faa.gov/act006/News/November99.htm.

Ray Swider, "LAAS Local Area Augmentation System", CGSIC Update, Sep. 14, 1998.

Steve Hodges, FAA Satellite Navigation Programs (WAAS/LAAS Update), Civil GPS Service Interface Committee (CGSIC) Meeting, FAA GPS Product Team AND-730, Mar. 28, 2000, pp. 1-12.

Dan Hanlon, "FAA Satellite Navigation Program", Civil GPS Service Interface Committee 33rd Meeting, Mar. 16, 1999.

* cited by examiner

METHOD AND APPARATUS FOR MOBILE DEVICE LOCATION VIA A NETWORK BASED LOCAL AREA AUGMENTATION SYSTEM

BACKGROUND

1. Field

The present disclosure pertains to the field of location systems. More particularly, the present disclosure pertains to techniques for providing improved precision location information using a network based local area augmentation system.

2. Description of Related Art

Mobile communication technologies have recently enjoyed substantial growth and are likely to continue to experience increasing growth and acceptance in the near future. Currently, many cars, trucks, airplanes, boats, and other vehicles are equipped with devices that allow convenient and reliable mobile communication through a network of satellite-based or land-based transceivers. Advances in this technology have also led to widespread use of handheld, portable mobile communications devices.

Many customers of mobile communications systems also find desirable an accurate determination of their location. Such information may be reported to a remote location to provide various location-based services. For example, a cellular telephone in a vehicle or carried by a person offers a convenient communication link to report location information. Services such as directions or the location of nearby facilities of a desired type may be provided based on the location information relayed. In current systems, location information is generated by traditional positioning systems, including a satellite-based positioning system such as the global positioning system (GPS) using NAVSTAR satellites, the Russian GLONASS system, or the European EUTEL-SAT system, or a land-based positioning system, such as LORAN-C. These approaches, however, may not be suitable for particular applications that require highly accurate and/or reliable location information.

One known technique for providing improved location information involves the use of differential GPS calculations (see, e.g., U.S. Pat. No. 5,913,170). Such systems may use a single fixed base station in a known location with a GPS receiver to generate correction signals. These correction signals are relayed to the mobile device (e.g., a phone), where they can be used to improve the accuracy of the location information derived by a GPS receiver in the phone. The use of a single base-station based correction information computation engine and a single tower's GPS receiver to perform calculations may be convenient; however, the accuracy and reliability of such systems may still not be sufficient for applications that benefit from highly precise location information.

Some other prior art systems utilize various fields of antennas or receivers to generate correction information. For example, a local area augmentation system (LAAS), also known as a ground based augmentation system (GBAS), may be used in airplane navigation and landing systems (see, e.g., U.S. Pat. No. 6,067,484). Such systems employ multiple ground receivers or beacons in fixed locations aligned along a runway. These receivers each individually transmit correction information to the GPS receiver in the airplane, which performs computations including all the information from the multiple receivers. This type of arrangement may be impractical for cellular phone and other consumer-oriented location devices because additional radio frequency receivers are needed to receive information from the runway beacons and because the multiple beacons each provide data requiring substantial additional computations at the GPS receiver. Such complicated processing may disadvantageously burden the processing resources and/or the power (e.g., battery) resources of a mobile device. Moreover, wide deployment of many such beacons solely for the purpose of a positioning system would be a costly undertaking.

Additionally, one other prior art location technique is a wide area augmentation system (WAAS). The WAAS also provides supplemental correction data in order to establish better locations. One such system is being deployed with a limited set of antenna stations (currently 25) being deployed throughout the United States. This system, however, also relies on radio-frequency transmission of correction information. Moreover, correction data from single, widely spaced antennas may not provide sufficiently accurate correction information to allow sufficiently precise location calculations to be performed for some applications.

BRIEF DESCRIPTION OF THE FIGURES

The present invention is illustrated by way of example and not limited by the figures of the accompanying drawings.

DETAILED DESCRIPTION

The following description provides techniques for mobile device location using a network based local area augmentation system. In the following description, numerous specific details such as particular positioning systems, types of location calculation correction information, techniques for transmitting information, and functionality partitioning choices are set forth in order to provide a more thorough understanding of the present invention. It will be appreciated, however, by one skilled in the art that the invention may be practiced without such specific details.

A disclosed network based local area augmentation system (nLAAS) may advantageously provide a practical and scalable implementation for calculating accurate and reliable location information for a variety of mobile devices. Due to the practical and scalable nature of some embodiments, wide deployment may be effectively undertaken. Due to the high reliability and accuracy, new localized data services may be provided and existing services enhanced. Additionally, new service models involving charging various "customers" or users for location information or location based services may be employed using the disclosed techniques.

Figure 1:
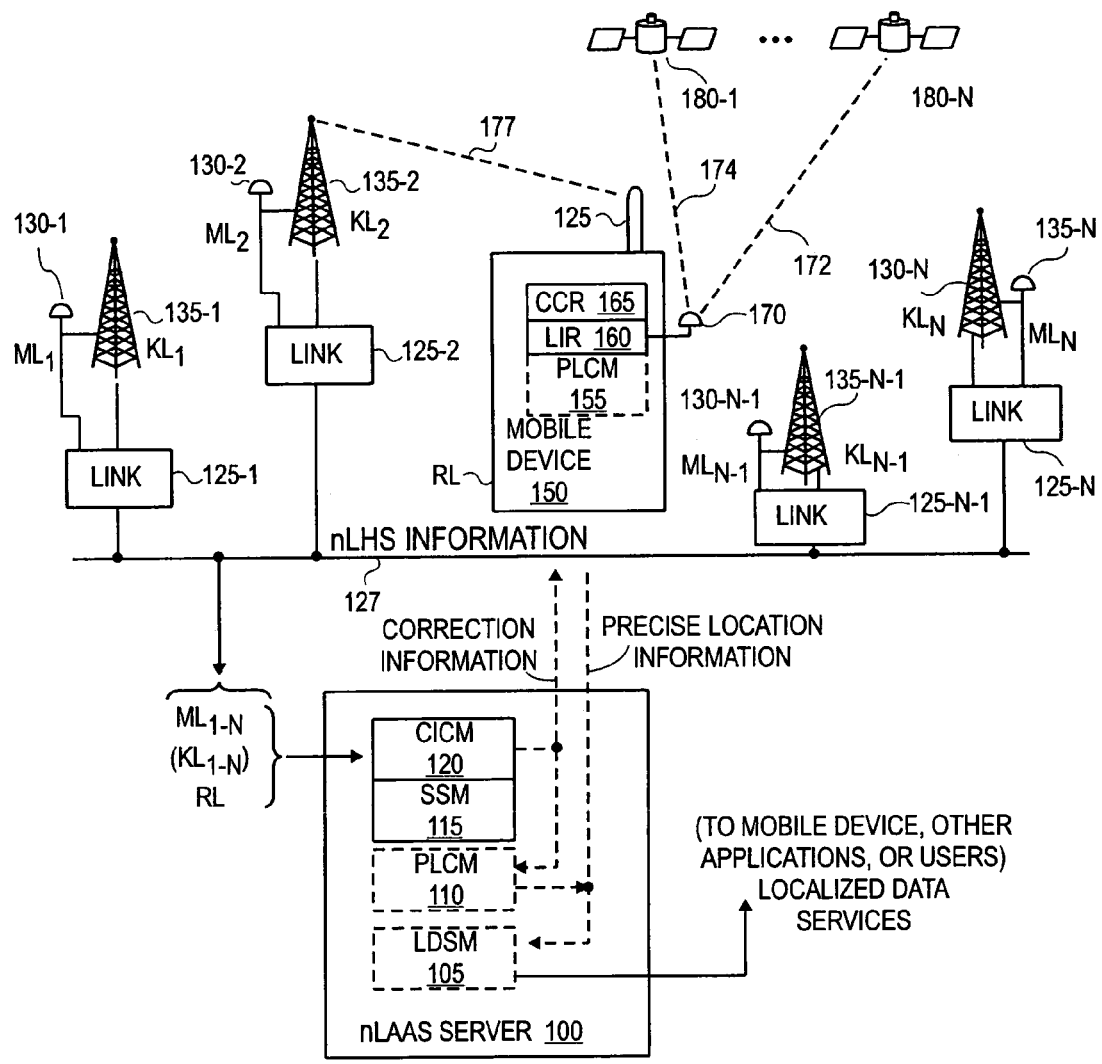
FIG. 1 illustrates a network based local area augmentation system and options for placement of various component parts in different embodiments of such a system.

FIG. 1 illustrates a generalized network based local area augmentation system. In general, the system of FIG. 1 utilizes an nLAAS server 100 in conjunction with a set of networked positioning receivers 130-1 to 130-N located at various cellular base stations 135-1 to 135-N (which are at known locations) to calculate correction information. The correction information helps improve the accuracy and reliability of a computation of the location of a mobile device 150. The use of cellular base stations in this approach has several advantages. Current cellular base stations positioned in relatively close proximity (e.g., within every few miles or less in some urban areas) in comparison to other augmentation systems such as WAAS (e.g., less than 100 in the entire country). Therefore, improved accuracy of correction information may be obtained from having more numerous and closely spaced receivers to account for atmospheric and other effects which tend to degrade the accuracy of positioning systems. Furthermore, it is estimated that future or wireless technologies will involve base stations deployed even more densely than current systems. For example, third generation wireless base stations may be deployed every 300 meters in some areas. Thus, base stations do currently and are likely to continue to provide a relatively pervasively deployed platform for isolating localized effects that degrade positioning system accuracy.

Prior art systems that employ multiple remote receivers to generate correction information (e.g., aircraft landing systems) are not designed to be scalable to receive location information from multiple receivers spread over a large area. Rather, aircraft landing systems are limited to radio communications with runway beacons. Additionally, such systems rely on substantial space and computing power being available on board the aircraft. The aircraft equipment includes separate radio receivers to receive individual information transmissions from the beacons, with the information from all of the various beacons being processed on board the aircraft. Furthermore, such systems do not utilize a networked server or other networked machine to calculate correction information from dynamically determined sets of receivers.

In contrast, an nLAAS arrangement such as that shown in FIG. 1 provides for transmission of nLAAS information from a variety of sources (e.g., the various base stations) over a network 127, which may be a pre-existing network such as the Internet. As a result, correction information calculations can be performed at any of the variety of convenient locations so long as access to the network is available. In some embodiments, therefore, computations for mobile devices are performed by networked servers. Additionally, precise location calculations may also be performed in any of a variety of convenient locations, again potentially offloading computations from mobile devices. The correction information and/or precise location information may then advantageously be transmitted through existing channels to reach the appropriate service provider(s) and/or the mobile device 150. For example, the correction information may be transmitted via the network to a service provider and may then be transmitted via existing data channels used in cellular communication with the mobile devices. Thus, the use of a network based LAAS advantageously allows LAAS information to be easily routed and for computations to be performed in convenient locations.

Additionally, network based LAAS techniques may utilize existing cellular infrastructure reduce overall deployment costs. Cellular base stations provide not only a housing for a positioning system receiver at each location, but also may already include positioning receivers that are used for synchronization purposes. Moreover, existing data channels may be used to communicate with the mobile device. Thus, a network based LAAS technique may advantageously leverage existing cellular infrastructure components.

Turning to the details of the system shown in FIG. 1, the mobile device 150 has a roving location (RL). The mobile device 150 is in communication with a set of satellites 180-1 through 180-N as indicated by dashed lines 172 and 174. A location information receiver 160 receives location information signals from the satellites 180-1 to 180-N through an antenna 170. In an embodiment that communicates with GPS satellites, typically the mobile device 150 communicates with at least four satellites in order to accurately resolve its location. Stand-alone GPS receivers are known technologies to those in the art and are currently found in cars, mobile phones as well as numerous other devices.

The mobile device 150 is also in communication with the base station 135-2 as indicated by dashed line 177. The mobile device 150 includes an antenna 175 coupled to a cellular communications receiver (CCR) 165. Any known or otherwise available and appropriate wireless communication technology can be used for communication between the mobile device 150 and the base station 135-2. Notably, the mobile device 150 communicates with different base stations depending on its location and its proximity to the various base stations in the area. The mobile device may be a phone, a personal digital assistant, a vehicle, a vehicular tracking device, or any other movable device with a power supply mechanism to allow operation of electronic components.

Figure 2:
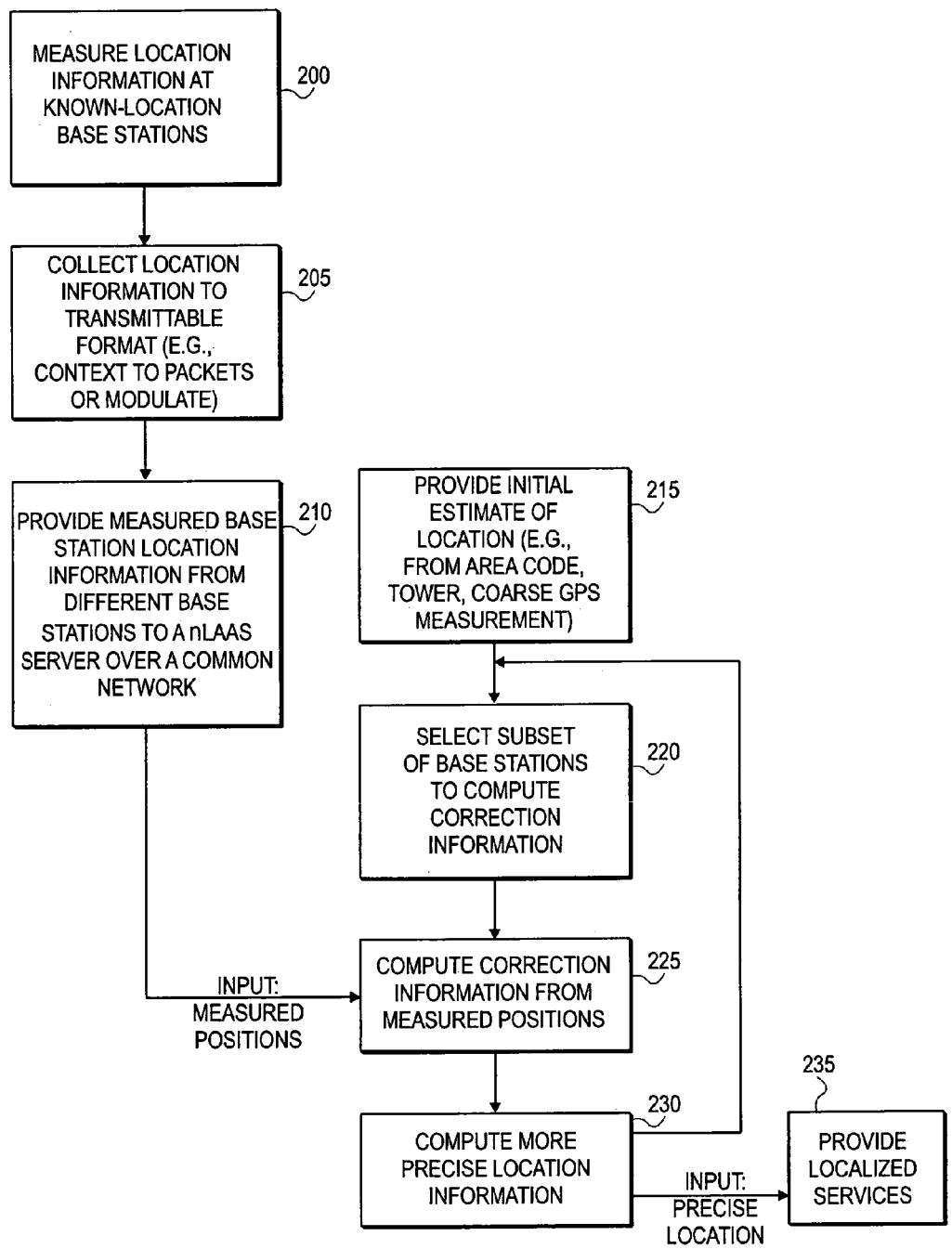
FIG. 2 illustrates one embodiment of a technique of providing location information and localized services based on that location information.

In one embodiment, a precise location calculation module 155 is included within the mobile device 150. In this embodiment, typically, a precise location calculation module 110 is not included in the nLAAS server 100. Operations for one embodiment of such a system are shown in FIG. 2, and components of FIG. 1 will be discussed with reference to these operations.

In block 200, location information at the base stations 135-1 through 135-N is measured by the corresponding ones of the positioning receivers 130-1 through 130-N at that base station. Each base station has a known location, so a known location and a measured location is available. The measured location may be the result of a geological survey or other physical measurement techniques or may be the result of location readings such as readings with highly precise equipment or readings averaged over a long period of time. As indicated in FIG. 1, base station 135-1 has a known location ($KL_1$) and a measured location ($ML_2$). Likewise, base station 135-2 has known location ($KL_2$) and measured location ($ML_2$), base station 135-N-1 has known location ($KL_{N-1}$) and a measured location ($ML_{N-1}$), and base station 135-N has a known location ($KL_N$) and a measured location ($ML_N$). In some embodiments, all "base stations" may be cellular communication system base stations; however, other embodiments may include base stations dedicated to positioning or may use other structures.

In block 205, location information is converted into a transmittable format. For example, a link 125-1 at base station 135-1 transmits the location information to the network 127. This may be accomplished using a variety of mechanisms. For example, some current cellular base stations communicate with switching centers via land-based communication lines such as T1 lines. Location information may be modulated such that it can be communicated over such a communication line. Alternatively, the location information may be simply converted into a format that equipment at the base station can receive and transmit along with the transmissions received from mobile devices. In any case, the link 125-1 communicates location information to the network 127. Similarly, a link 125-2 links the base station 135-2 to the network 127, a link 125-N-1 links the base station 135-N-1 to the network 127, and a link 125-N links the base station 135-N to the network 127.

The measured base station location information from the different base stations is provided to the nLAAS server 100 as indicated in block 210. In some embodiments, the links from the base stations may themselves direct the appropriate traffic to the server 100 to accomplish this transmission of information. In other embodiments, intermediate entities or machines may receive and/or repackage or convert such information before it is transmitted to the network 127 and the server 100.

As indicated in block 215, an initial estimate of the location (RL) of the mobile device 150 is provided. This initial estimate may be provided by a variety of mechanisms. For example, a default may be chosen based on the area code of the phone. Alternately, the location may be chosen based on the location of the base station which is presently communicating with the mobile device 150. For example, in the embodiment shown in FIG. 1, a location based on the known location of base station 135-2 may be chosen. Alternatively, the location information receiver 160 in the mobile device 150 may provide a coarse measurement of the location of the mobile device 150. Other known or otherwise available techniques may be employed to establish an initial estimate of the location of the mobile device 150.

As indicated in block 220, a subset of the base stations 135-1 to 135-N are chosen to provide an accurate computation of correction information for the mobile device 150. This computation may be performed by a station selection module 115 in the nLAAS server 100. Once a subset of the total set of base stations is chosen, correction information may be computed by a correction information calculation module (CICM) 120 as indicated in block 225. The nLAAS server receives measured and known locations from the base stations $M_{1-N}$ and either receives or has the known locations $KL_{1-N}$. The measured locations of the selected base stations are used by the correction information calculation module 120 in computing the correction factors. In various embodiments, one or both of psuedorange and/or carrier-phase corrections are generated by the correction information calculation module 120. In other embodiments, other information may be transmitted and used. For example, satellite ephemeris information may be transmitted for receiver cold start. Other satellite information such as almanac data may also be transmitted The correction information calculation module 120 outputs the correction information, as indicated by a dashed line so labeled in FIG. 1. In one embodiment, this information is ultimately transmitted to the mobile device 150 where the precise location calculation module 155 incorporates the correction information to make a more precise computation of the location of the mobile device (block 230). The correction information may be transmitted to the mobile device by a variety of known or otherwise available mechanisms as well as those described herein. The correction information may be transmitted partially via the network to the link 125-2 or via one or more service providers before the link 125-2 and the base station 135-2 are reached.

In some embodiments, the precise location information may also be transmitted to the mobile device; however, the precise location information may not actually be needed by the mobile device in other embodiments. Rather, it may be desirable to provide location-specific information to the mobile device or to various applications (e.g., fleet or personal tracking applications). Thus, in order to provide such applications, the precise location information may be transmitted to a localized data services module (LDSM) 105. The LDSM 105 then may provide a variety of localized services based on the location of the device as indicated in block 235.

A great variety of such services may be available, but some examples may include personal or vehicle navigation, localized marketing or services applications, fleet tracking, enhanced 911 services, telematics, etc. Localized marketing services may provide advertisements for goods or services in the locale of the mobile device and/or may provide incentives for purchases or other transactions in the area. Localized billing for phone usage is another possibility. Localized billing for phone services involves charging different rates for usage based on small scale locale changes (e.g., making it cheap to continue to use your cellular phone while in your own home so that you do not use the land line).

Figure 3A:
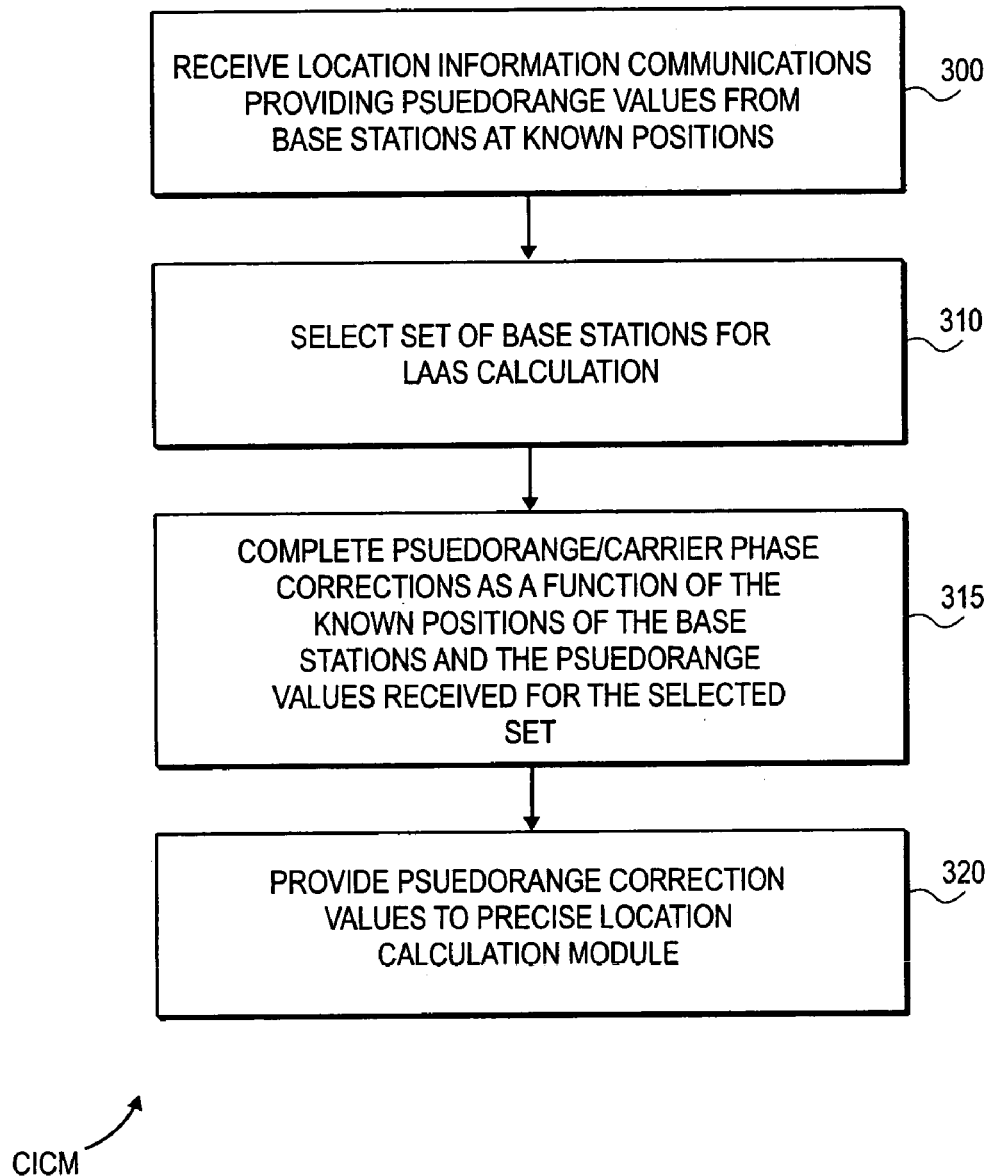
FIG. 3a illustrates operations performed by one embodiment of a correction information calculation module.

FIG. 3a illustrates operations performed by a correction information calculation module in one embodiment. As indicated in block 300, location information communications providing psuedorange values are received from the base stations at their known locations. Only a subset of the total group of base stations is used (based on the location of the mobile device 150) as indicated in block 310. This subset selection may occur at various times and/or repeatedly, and the operations shown in this and other diagrams may not be illustrated in a sequential order for all embodiments. It is also worth noting that not every cellular base station may need to have a positioning receiver to provide sufficiently precise correction information. Thus, the set of base stations with positioning receivers may be a subset of the total set of base stations and the subset of base stations used in a particular computation may be a subset of the set of base stations with positioning system receivers.

Next, as indicated in block 320, psuedorange and/or carrier-phase correction values are computed as a function of the known locations of the base stations and the location information received for the selected set of base stations.

Known or otherwise available LAAS techniques may be used to perform these calculations in a manner understood by those of skill in the art. Alternatively, other techniques may be used to calculate and compensate for localized distortions or localized phenomena that may influence the accuracy of the particular positioning system being used.

Figure 3B:
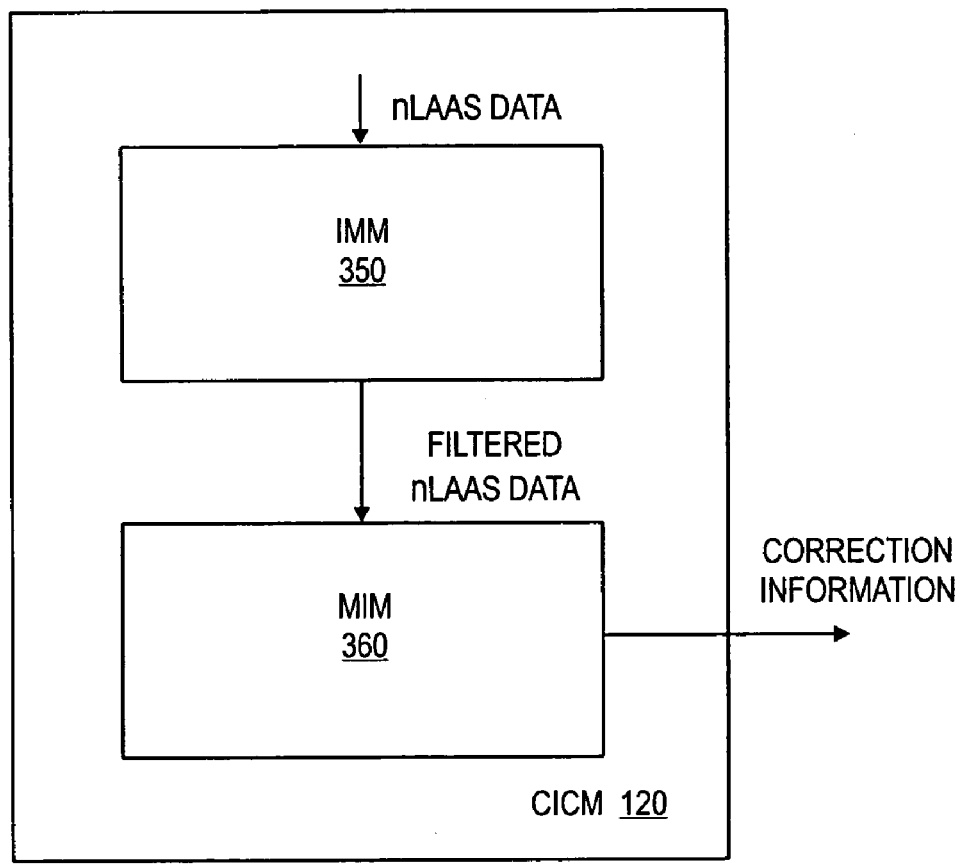
FIG. 3b illustrates one embodiment of a correction information calculation module.

In one embodiment, shown in FIG. 3b, the correction information calculation module 120 includes an integrity monitoring module (IMM) 350 and a measurements integration module (MIM) 360. The integrity monitoring module helps ensure the integrity of correction information generated by the correction information calculation module 120 by monitoring the quality of data input to the correction information calculation module 120. Thus, the integrity monitoring module 350 detects and excludes data that reflects a failure of some sort on the part of one of the reference receivers at a base station (or the transmission facilities between the receiver and the correction information calculation module). The integrity monitoring module 350 may detect reference receiver failure due to a variety of causes, including cycle slip and code multipath errors.

The measurements integration module 360 stochastically integrates the individual reference measurements to compute the final correction information. Base station reference measurements may be filtered by the integrity monitoring module as described above prior to reaching the measurements integration module 360 to eliminate suspect location information. In some embodiments, the measurements integration module 360 provides adaptive integration of LAAS psuedo-range and carrier-phase reference measurements to generate correction information for transmission to the precise location calculation module. Such adaptive computation capabilities may help provide a robust location solution amenable to the demands of varying terrain and continuously changing locations of mobile devices.

Referring back to FIG. 3a, as indicated in block 330, the correction information calculation module 120 provides the psuedorange and/or carrier-phase correction values to the precise location calculation module. As previously discussed with respect to one embodiment of the system in FIG. 1, the precise location calculation module 155 may be included in the mobile device 150. In such a case, providing the correction information involves transmitting that information to the mobile device 150. In another embodiment of the system of FIG. 1, the precise location calculation module 110 is included remotely from the mobile device 150. The precise location calculation module 110 may be included in the nLAAS server 100, but may also be included at other locations, such as at switching centers, base stations, service providers, or other convenient locations. In these cases, the provision of correction information may involve an exchange between routines or computer systems.

Figure 4:
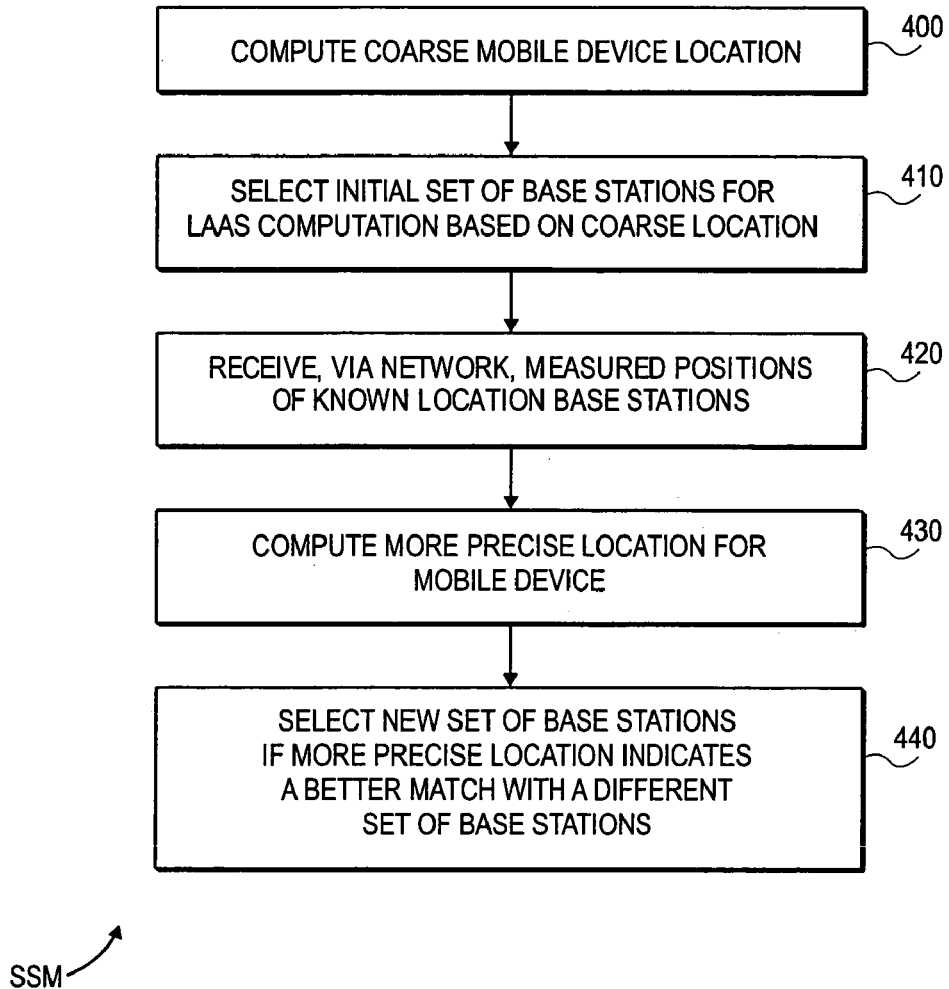
FIG. 4 illustrates operations performed by one embodiment of a station selection module.

FIG. 4 illustrates operations performed by one embodiment of the station selection module 115. As indicated in block 400, a coarse mobile device location may be computed or otherwise obtained according to various techniques previously discussed. Next, as indicated in block 410, an initial set of base stations for the LAAS computation are selected based on the coarse location. The station selection module may select a number and a set of base stations depending on a variety of criteria. For example, the set of base stations selected may depend on factors such as the distances between the stations, the terrain on which stations are located, the density of stations in the proximity of the user, empirically determined advantageous sets of stations for certain locations or areas, or by other known or available techniques. The station selection module may also select only base stations that are in view of or using the same set of satellites as the mobile device for which the correction information is being calculated. Measured locations for the base stations are received as indicated in block 420.

As indicated in block 430, a more precise location for the mobile device 150 is computed using the initial set of base stations. Once this more precise location is determined, a new set of base stations may be selected if the more precise location indicates a better match with a different set of base stations (block 440). The station selection module may be continuously or periodically activated in view of the fact that mobile devices are likely to move into new locations in which the different set of base stations would produce more precise results. Thus, the operations shown in FIG. 4 may be regularly or continuously repeated.

In view of the fact that remote and networked devices (remote from the mobile device and likely from the base station) are used to compute location information, one possible scenario is that a location provider or a location service provider has valuable information that the cellular service provider or an application service provider does not have. For example, in the system of FIG. 1, the owner of the nLAAS server 100 has access to at least correction information and may have access to precise location information if the precise location calculation module 110 is included in the server 100. Thus, this location service provider may wish to undertake the business model of charging other users and/or service providers for location information.

Figure 5:
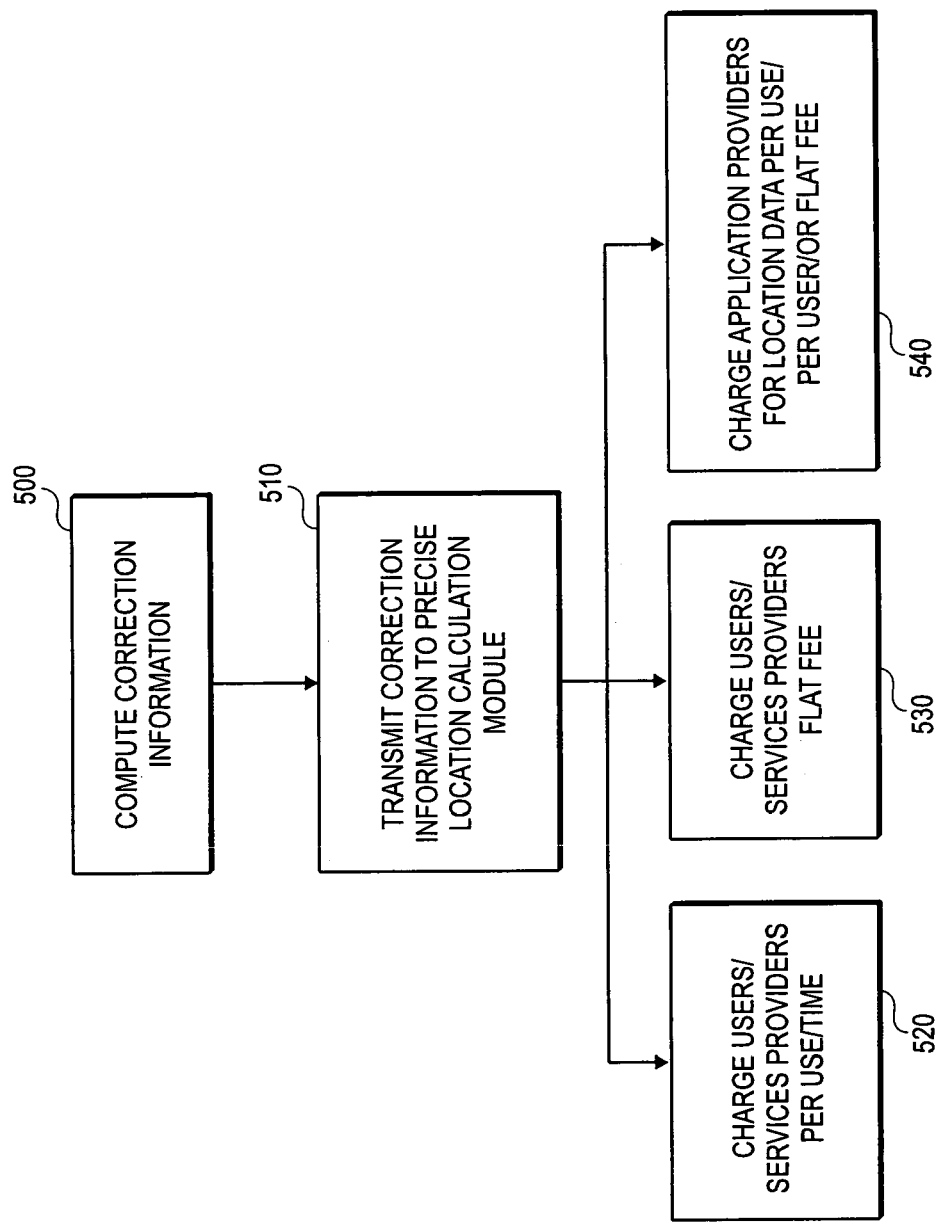
FIG. 5 illustrates several techniques that may be employed to charge for location information or location based services.

Several possible embodiments of such a business model are shown in FIG. 5. As indicated in block 500, correction information is computed. This correction information is transmitted to the precise location calculation module (wherever it may be) as indicated in block 510. Users or service providers may be charged for location information (i.e., either the correction information or the precise location information) on a per use or amount-of-time basis as indicated in block 520. Alternatively, users and/or service providers may be charged a flat fee for unlimited location information as indicated in block 530. Another alternative, indicated in block 540, is to charge application providers for location data. The application providers may also be charged a per use, per user, or flat fee basis. A combination of these approaches may also be used, potentially deriving revenue from multiple sources. Additionally, in other embodiments, other service providers may calculate location information and charge according to this or other models.

Figure 6:
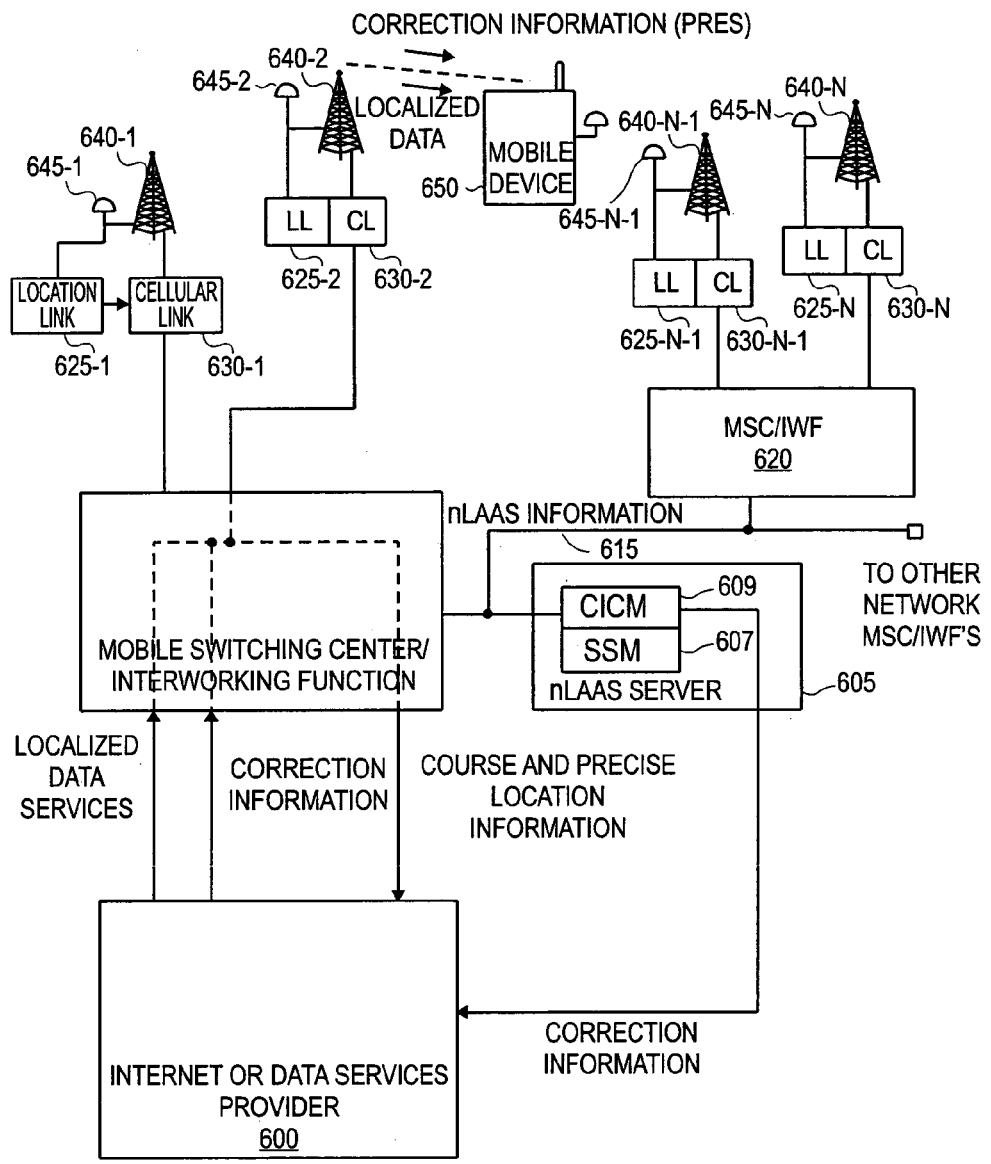
FIG. 6 illustrates one embodiment of a network based local area augmentation system that has separate entities or at least components that provide cellular services, location services, and Internet services.

FIG. 6 illustrates one embodiment of a network based local area augmentation system that has separate entities or at least components that provide cellular services, location services, and Internet services. In the embodiment shown in FIG. 6, a set of mobile switching center and interworking function (MSC/IW) units provide local area augmentation system information on a network 615. An nLAAS server 605 is also coupled to the network 615. In one embodiment, the Internet is used for these communications. In other embodiments, private networks, or a variety of other communications means may be used so long as the nLAAS server has access to the networked base stations via a network interface.

The nLAAS server 605 of FIG. 6 includes a correction information calculation module 609 and a station selection module 607 analogous to those previously described with respect to FIG. 1. The nLAAS server 605 provides correction information to an Internet or data services provider 600. This information may be provided to the service provider 600 via the Internet or other communication means. The service provider provides correction information to the MSC/IW 610. The correction information is passed on to a cellular link (CL) 630-2 to a base station 640-2 and via wireless transmission to a mobile device 650. The mobile device 650 computes precise location information and returns this information through the cellular link 630-2 and the MSC/IW 610 to the service provider 600. The service provider 600 may then provide localized data services through the mobile device 650. The same path for communication of data may be used for the localized data services as is used for the transmission of the correction information.

Similarly to the system discussed with respect to FIG. 1, the system shown in FIG. 6 includes other base stations 640-1, 640-N-1, and 640-N. Each base station has a positioning system receiver (e.g., a GPS receiver), respectively 645-1 through 645-N. In some embodiments (e.g., CDMA cellular phone systems), GPS receivers may be included at base stations for synchronization purposes. In other embodiments, GPS receivers may be added to the base station. Each base station includes a location link in this embodiment, respectively labeled 625-1 through 625-N. This location link takes the location information determined by the positioning system receivers 645-1 through 645-N and transmits this information to the nLAAS server 605 by converting the location information into a format that is accepted by and/or already transmitted by the cellular links 630-1 through 630-N. Some of the base stations (e.g., 640-N-1 and 640-N) may interface to the network 615 through other MSC/IWF 620. In this manner, the system may be scaled to allow nLAAS information to be gathered at many base stations through many MSC/IWFs.

Figure 7:
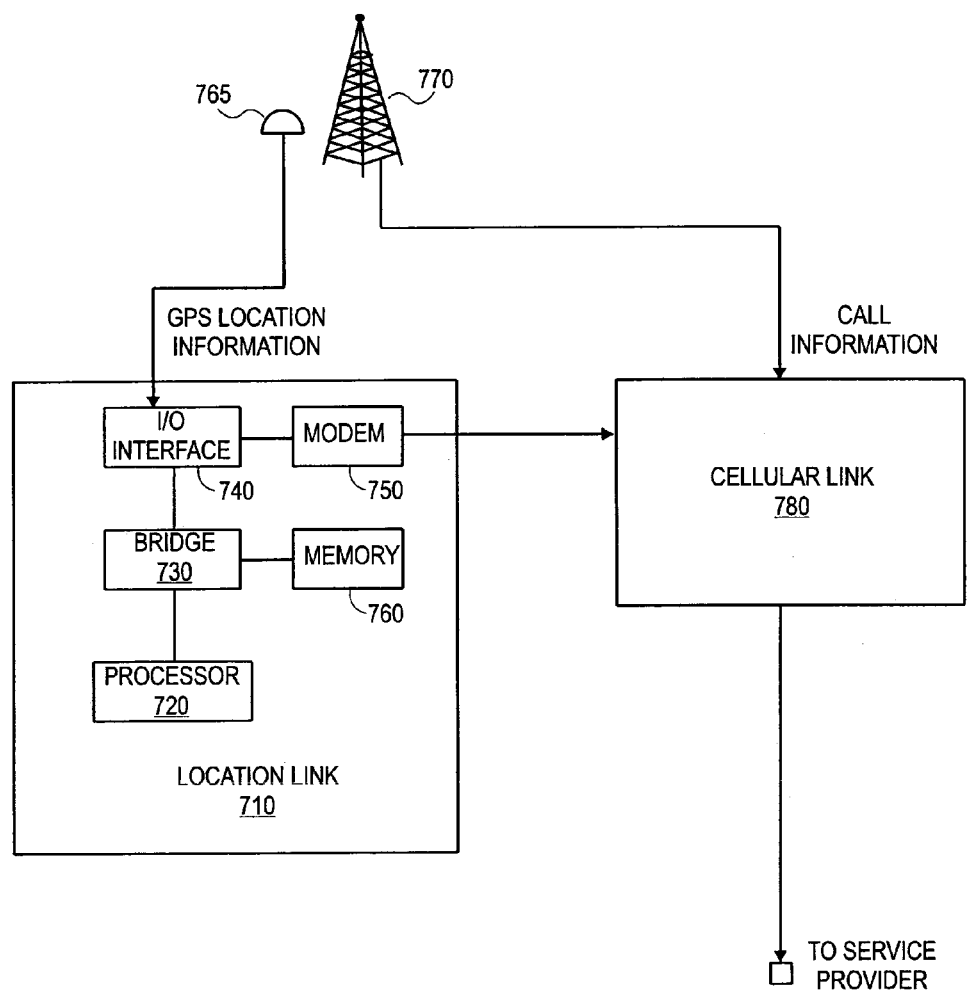
FIG. 7 illustrates one embodiment of a link module that links a base station and positioning receiver to a service provider.

FIG. 7 illustrates one embodiment of the location links and cellular links discussed with respect to FIG. 6. In the embodiment shown in FIG. 7, a base station 770 has a GPS receiver 765 that is coupled by a location link 710 to a cellular link 780. The cellular link 780 conveys cellular phone calls and associated information to the service provider (perhaps via a switching center). The GPS location information from the GPS receiver 765 is processed by the location link 710, which may be a general purpose computing device or module or may be a specialized dedicated device for the purpose of translating GPS location information into a format usable by the cellular link 780.

In the illustrated embodiment, the location link 710 includes an I/O interface 740 which receives GPS location information from the GPS receiver 765. A modem 750 modulates this information and it is passed along via the cellular link 780 as would be a telephone call. The location link also includes a processor 720, a memory 760, and a bridge 730 coupling the various components together. The memory contains programs executed by the processor to process the GPS location information received by the I/O interface.

Figure 8:
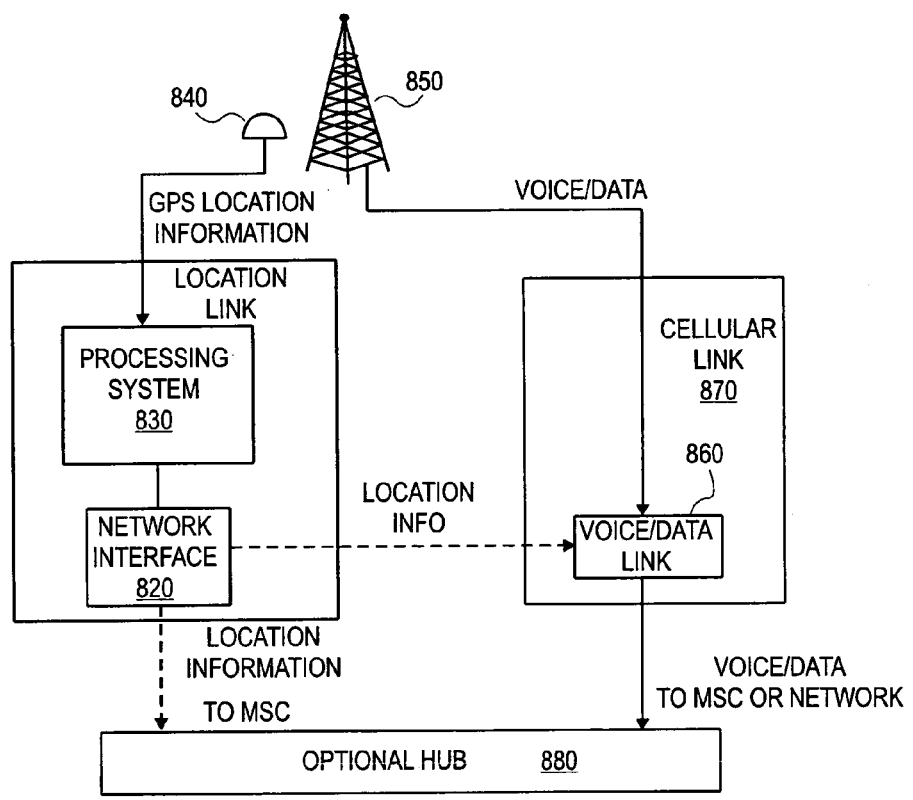
FIG. 8 illustrates another embodiment of a link module that links a base station and positioning receiver to a service provider or more directly to a network.

FIG. 8 illustrates other embodiments of the location link and the cellular link. In one embodiment shown in FIG. 8, a GPS receiver 840 again receives GPS location information for a base station 850. In this embodiment, the location link 810 includes a processing system 830 that receives the GPS information and provides that information to a network interface 820. The network interface 820 may itself transmit the location information in network format to a switching center or to a service provider. For example, if a base station itself is connected to the Internet or another network, then location information may be directly transmitted over the network to the correction information calculation module.

In other embodiments, the network interface may transfer location information in a format accepted by a voice and/or data link 860 in a cellular link 870. In some embodiments, the voice data link 860 may be a component that receives voice/data from RF wireless communication equipment and relays that voice/data information. Such equipment may have an additional input which may be used to transmit additional streams of data, and the location information may be provided to this additional input. In other cases, an optional hub 880 may need to be added to insert the additional location information into the steam of voice/data being transmitted via the cellular link 870.

Notably, the various linking structures may be a result of adding location services to systems that were not originally designed with such location services in mind. As cellular systems evolve, some such links may no longer be necessary. Thus, in some embodiments, (e.g., see FIGS. 1 and 6) the link may be a unified link. In such embodiments, the GPS receiver may output information packets that are directly transmittable on to the service provider, a switching center, or directly over the network to a computer that executes the appropriate correction information calculation module.

Figure 9:
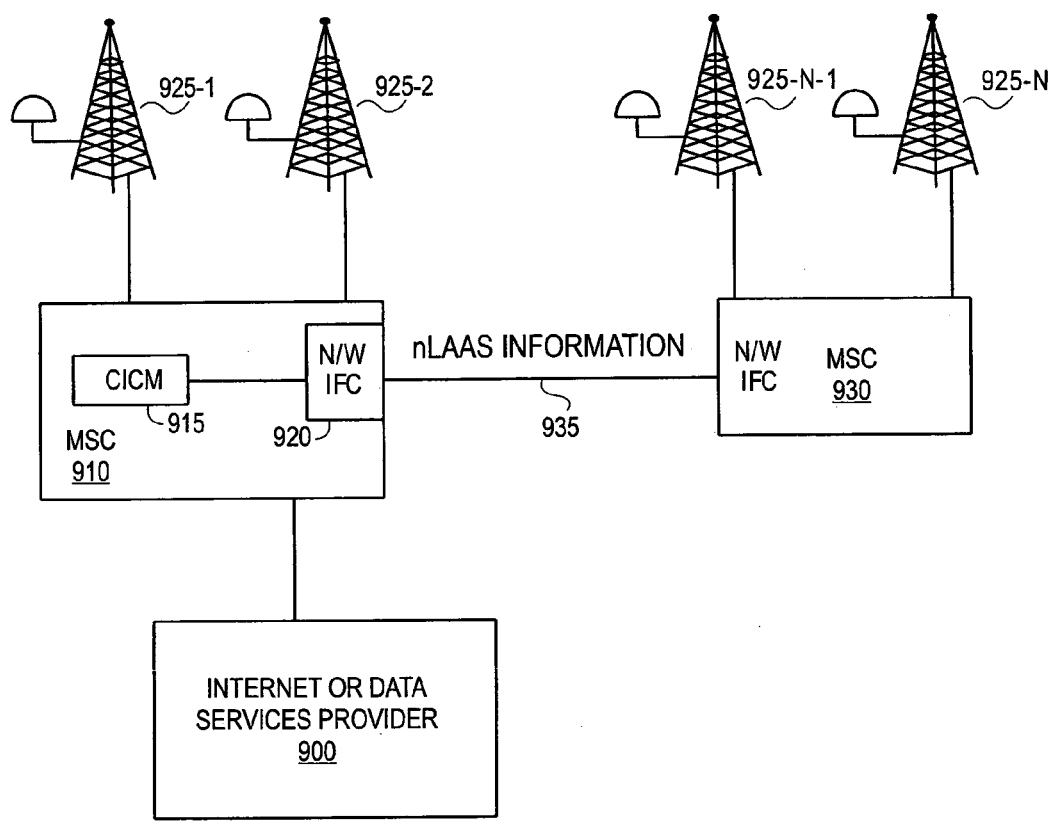
FIG. 9 illustrates an embodiment of a network based local area augmentation system in which the correction information calculation module is included in a mobile switching center.

FIG. 9 illustrates an embodiment of a network based local area augmentation system in which the correction information calculation module is included in a mobile switching center (MSC). In the embodiment of FIG. 9, base stations 925-1 through 925-N each have a positioning system receiver that transmits location information to one of a set of mobile switching centers 910 and 930. Each mobile switching center is coupled to a network 935, and nLAAS information is communicated over the network via network interfaces. The mobile switching center 910 includes a network interface 920 and additionally includes a correction information calculation module 915. Thus, in this embodiment, correction information may be calculated at one of the switching centers, obviating the need for a separately located or arranged machine to perform correction information calculations. An Internet or data services provider 900 may receive location information from the MSC 910 and responsively provide localized data services.

Figure 10:
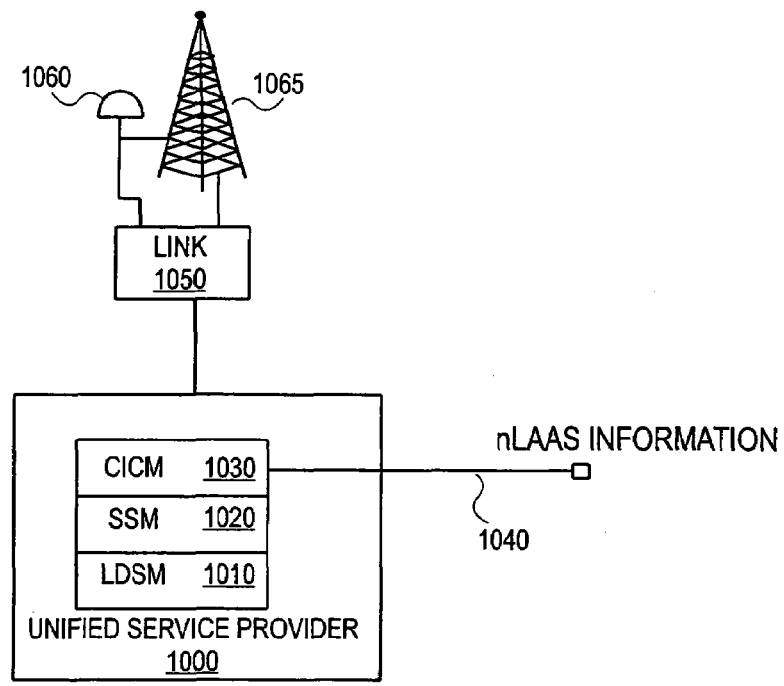
FIG. 10 illustrates an embodiment of a network based local area augmentation system in which a unified service provider provides correction information calculation facilities as well as localized data services.

FIG. 10 illustrates an embodiment of a network based local area augmentation system in which a unified service provider provides correction information calculation facilities as well as localized data services. In the embodiment of FIG. 10, a base station 1065 having a positioning system receiver 1060 is linked by a link 1050 to a unified service provider 1000. The unified service provider 1000 provides a correction information calculation module (CICM) 1030, a station selection module (SSM) 1020, and a localized data services module (LDSM) 1010. The correction information calculation module is coupled to a network 1040 to receive nLAAS information from other networked base stations (not shown). This embodiment advantageously centralizes the location calculations with their associated services, thereby potentially reducing the numbers and layers of communications and likely the latencies involved in providing the localized services. This embodiment is a likely implementation for cellular service providers who are also Internet or data service providers.

Figure 11:
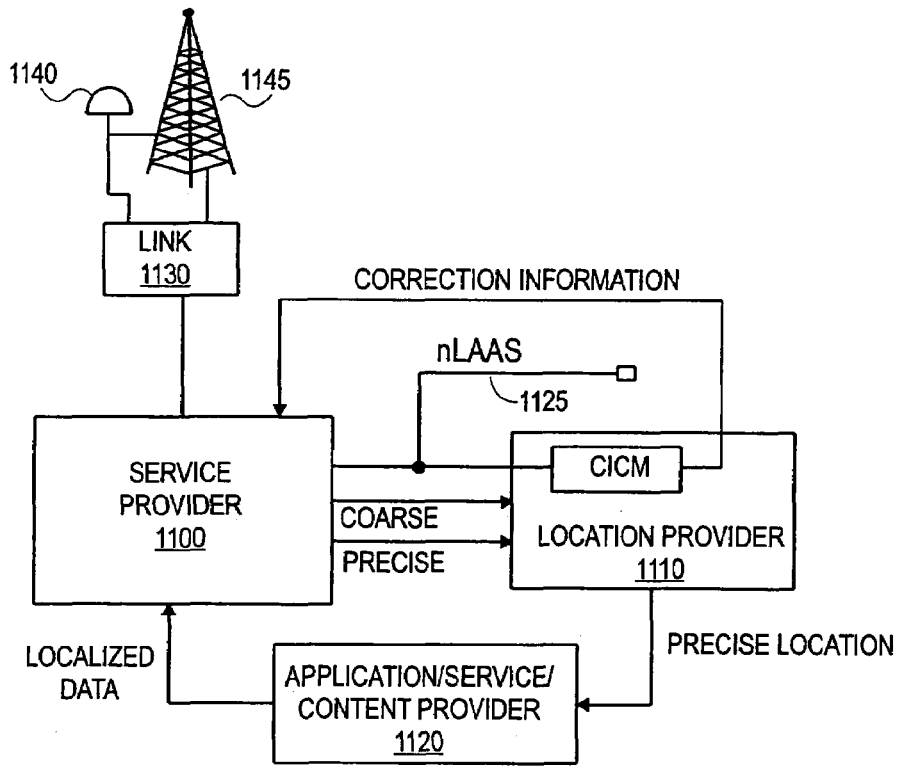
FIG. 11 illustrates an embodiment of a network based local area augmentation system in which separate application or content providers receive location information from a location provider and provide localized services to users via the service provider for the user.

FIG. 11 illustrates an embodiment of a network based local area augmentation system in which separate application or content providers receive location information from a location provider and provide localized services to users via the service provider. In the embodiment of FIG. 11, a base station 1145 and associated positioning system receiver 1140 transmit information to a service provider 1100 via a link 1130. A location provider 1110 includes a correction information calculation module 1115 that is used to compute correction information from the nLAAS information received from the base station 1145 and various other networked base stations (not shown) via a network 1125. Additionally, the location provider may utilize coarse location information received from the service provider to determine the proper set of base stations to use in the computation of the correction information. Precise location information may be computed by the location provider 1110 or may be computed by the mobile device and transferred to the location provider through the service provider 1100 as shown. An application provider or content provider 1120 receives precision location information from the location provider 1110 and provides localized data services to a mobile device/user via the service provider 1100.

Figure 12:
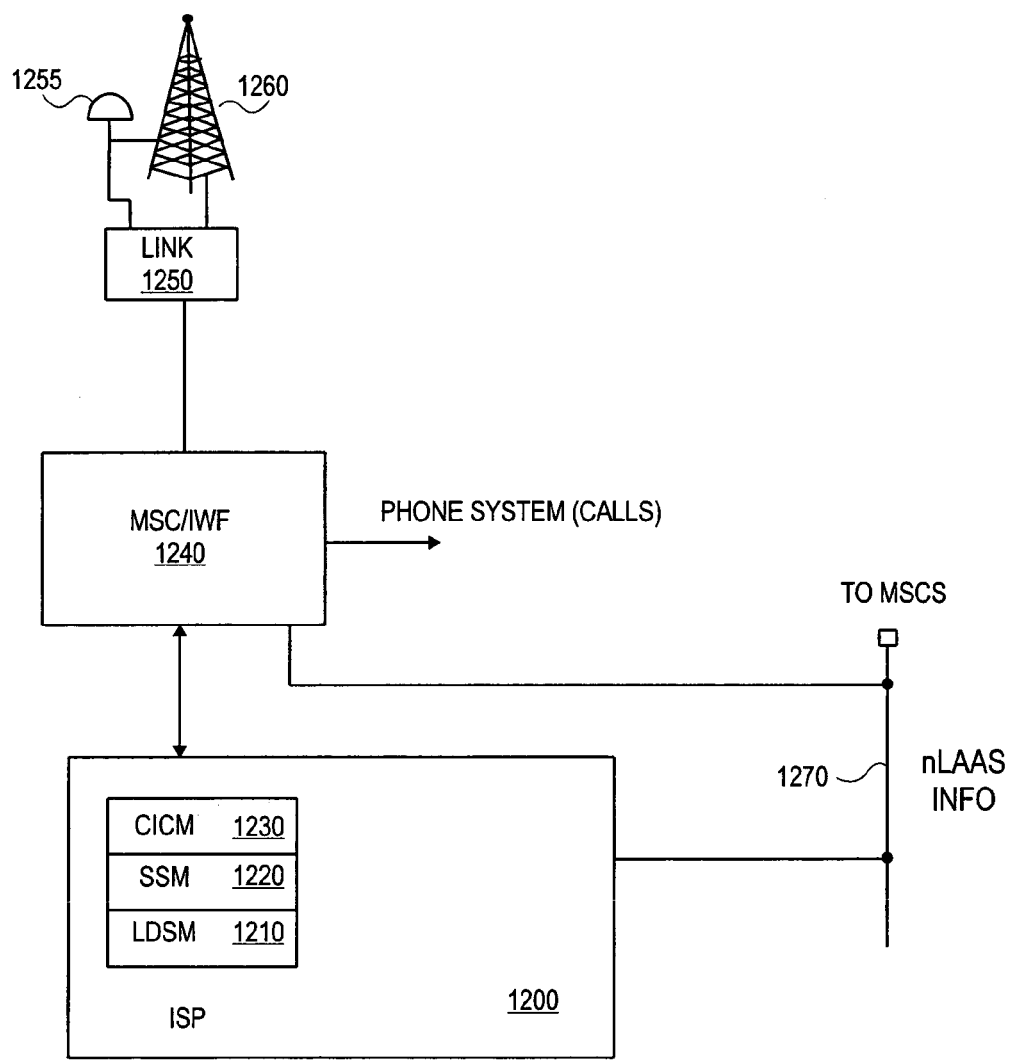
FIG. 12 illustrates an embodiment of a network based local area augmentation system in which an Internet service provider provides correction information facilities as well as localized data services.

FIG. 12 illustrates an embodiment of a network based local area augmentation system in which an Internet service provider provides correction information facilities as well as localized data services. In the embodiment of FIG. 12, a base station 1260 and an associated positioning system receiver communicate 1255 with a mobile switching center/interworking function (MSC/IWF) 1240 via a link 1250. The MSC/IWF 1240 transfers calls to the phone system and processes data requests by sending them to an Internet service provider (ISP) 1200. In this embodiment, the ISP 1200 provides a correction information calculation module (CICM) 1230, a station selection module (SSM) 1220, and a localized data services module (LSDM) 1210. Correction information is computed by nLAAS information computed from a number of base stations similar to base station 1260 that all communicate to a network 1270 via a network interface such as network interface 1240 at their respective MSC/IWFs. The arrangement of FIG. 12 consolidates location calculation facilities with the ISP in an environment where the ISP is not also a cellular phone service provider.

Figure 13:
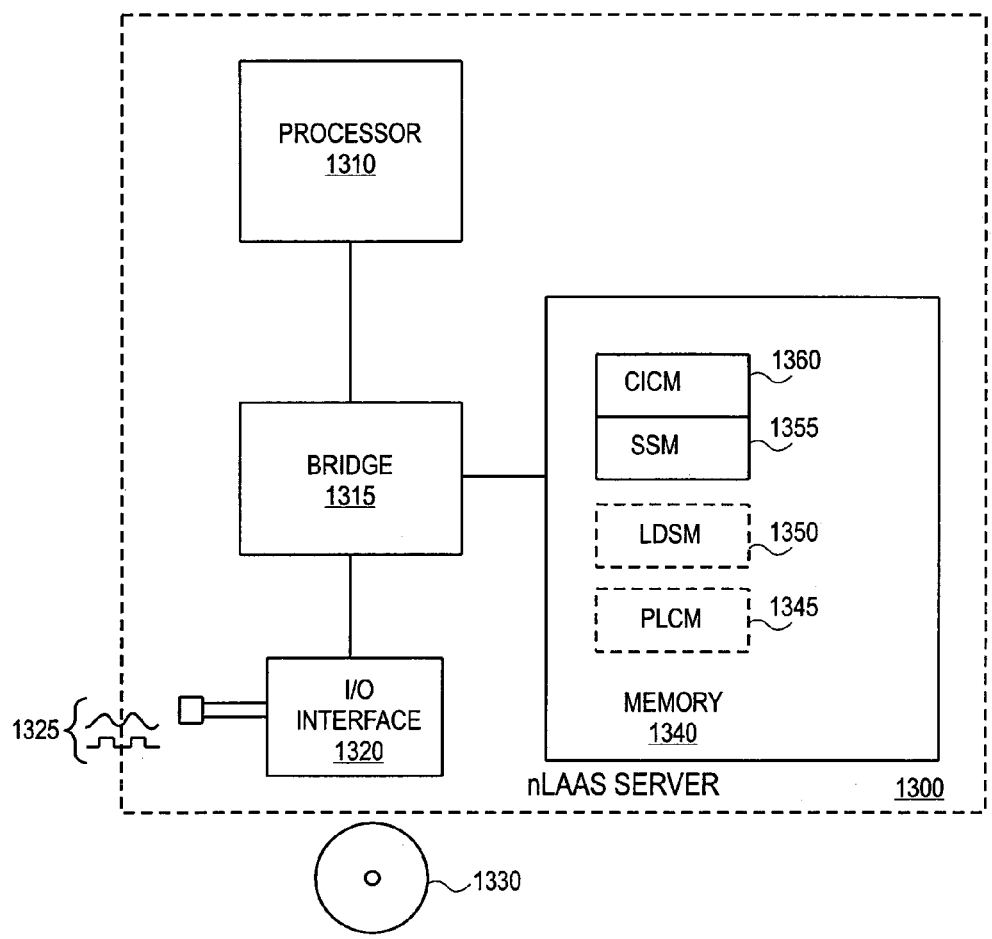
FIG. 13 illustrates an embodiment of a network based local area augmentation system server.

FIG. 13 illustrates an embodiment of a network based local area augmentation system server. In some embodiments the various functions discussed may be performed by a single machine. In other embodiments the various functions may be distributed to several machines. In still other embodiments, single functions may be performed across multiple machine and/or split in a variety of manners as appropriate for the particular arrangement.

The embodiment of an nLAAS server 1300 shown in FIG. 13 includes a bridge 1315 which couples a processor 1310 to a memory 1340 and an I/O interface 1320. The memory contains, among other things, the various modules that may be executed by the nLAAS server 1300. In the embodiment shown, the nLAAS server 1300 includes a correction information calculation module (CICM) 1360, a station selection module (SSM) 1355 and optionally may include a localized data services module (LSDM) 1350 and a precise location calculation module (PLCM) 1345. In this embodiment, these modules are software modules. In other embodiments, the modules may be software, hardware, firmware, or any combination of these or other technologies that may implement the desired functions. The memory 1340 stores location information after it is received for processing by the processor 1310.

The I/O interface 1320 may receive the software modules (for example, if newly programmed on the machine or updated to a later revision). Thus, a machine readable medium may be used to transmit the software. Machine readable mediums are any mediums that can store, at least temporarily, information for reading by a machine interface. This may include signal transmissions 1325 (via wire, optics, or air) and/or physical storage media 1330 such as various types of disk and memory storage devices. The nLAAS server 1300 executes the appropriate modules as described herein to implement the functionality appropriate for the particular embodiment.

Thus, techniques for mobile device location using a network based local area augmentation system is disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A system comprising:
   a plurality of base stations, each base station comprising:
      a positioning receiver to generate base station location information, each positioning receiver having a known location, and
      a link to a network to transmit said base station location information;
   a station selection module to select a subset of the plurality of base stations based at least in part on each base station of the subset utilizing a set of satellites that is also utilized by a mobile device; and
   a correction information calculation module coupled to the network to receive base station location information from each base station of the subset via the network, the correction information calculation module to calculate correction information as a function of the received base station location information and the known location for each base stations of the subset, wherein the correction information calculation module includes:
      an integrity monitoring module to monitor the received base station location information and to prevent received base station location information that has been corrupted from being used by the correction information calculation module, and
      a measurements integration module to stochastically integrate non-corrupted base station location information to derive said correction information.

2. The system of claim 1 wherein said station selection module selects an updated subset of the plurality of base stations, which may or may not differ from the subset, based on a location of the mobile device computed using a correction information computed using the subset.

3. The system of claim 1 wherein the received base station location information that has been corrupted comprises base station location information that has been corrupted by cycle slip and code multipath errors.

4. The system of claim 1 wherein each link comprises a first network interface to receive base station location information from a positioning receiver at a base station and to generate a first set of signals for transmission of said base station location information from said positioning receiver.

5. The system of claim 4 wherein said first network interface packetizes said base station location data for network communication to said correction information calculation module.

6. The system of claim 4 wherein said first network interface comprises a telephony communications interface, the apparatus further comprising:
   a second link to receive said first set of signals via one or more signal lines from the base station and to extract said base station location data;
   a second network interface to receive said base station location data from said second link and to generate a second set of signals for transmission of said base station location data to the correction information calculation module via the network.

7. The system of claim 1 wherein said link comprises a modem to modulate base station location information from a positioning receiver into a modulated signal for transmission over a telecommunications link.

8. The system of claim 7 further comprising:
a second link to receive said modulated signal from said telecommunications link and to extract said base station location information;
a network interface to receive said base station location information from said second link and to generate a second set of signals for transmission to the correction information calculation module via the network.

9. The system of claim 1 further comprising:
a receiver module to communicate with a positioning system to determine preliminary position-related information; and
a precise location calculation module to calculate a receiver location from said correction information and said preliminary position-related information.

10. The system of claim 9 wherein said precise location calculation module and said receiver module are included in a roving receiver device, wherein said roving receiver device receives said correction information from said correction information calculation module via a message on the network that is converted to a wireless transmission from one of said plurality of base stations to said receiver module.

11. The system of claim 10 wherein said preliminary position-related information comprises a set of psuedoranges.

12. The system of claim 10 wherein said correction information comprises one or more of LAAS-based pseudorange corrections and LAAS-based carrier-phase corrections.

13. The system of claim 9 wherein said precise location calculation module is located remotely from said receiver module, wherein said receiver module transmits said preliminary position-related information via a wireless message that is converted to a message that is transmitted on the network to said precise location calculation module.

14. An system comprising:
a plurality of cellular communications base stations, each base station comprising:
a positioning receiver to generate base station location information, each positioning receiver having a known location;
a link to a network to transmit said base station location information;
a first module coupled to the network to receive base station location information from each of the plurality of base stations via the network, the first module to calculate correction information as a function of the received base station location information and the known location for all of the plurality of base stations;
a second module to select location information from a selected subset of said plurality of base stations and to omit location information from an omitted subset of said plurality of base stations from computation of said correction information, wherein the second module selects the subset of base stations based at least in part on each of the subset of base stations utilizing a set of satellites that is also utilized by a receiver for which a set of correction information is being computed;
a third module to communicate with a positioning system to determine preliminary position-related information; and
a fourth module to calculate the receiver location from said correction information and said preliminary position-related information;
wherein the first module includes:
a fifth module to monitor the received base station location information and to prevent received base station location information that has been corrupted from being used by the first module, and
a sixth module to stochastically integrate non-corrupted base station location information to derive said correction information.

15. The system of claim 14 wherein the network is the Internet and wherein said first module and said second module are programs executed by a server connected to the Internet.

16. The system of claim 15 wherein the third module, the fourth module, the fifth module, and the sixth module are programs executed by the server connected to the Internet.

17. An apparatus comprising:
a network interface to receive base station location information from a plurality of base stations from a network;
an integrity monitoring module to monitor the received base station location information and to discard received base station location information that has been corrupted;
a correction information calculation module to compute a correction information for a mobile device as a function of non-discarded base station location information received from the base stations, wherein the correction information calculation module includes a measurements integration module to stochastically integrate non-discarded base station location information to derive said correction information;
a station selection module to select a subset of the base stations based at least in part on each base station of the subset utilizing a set of satellites that is also utilized by the mobile device; and
a localized data services module to provide localized information based on a location computed using said correction information.

18. The apparatus of claim 17 further comprising:
a data link to receive location information for the mobile device.

19. The apparatus of claim 18 wherein said data link comprises a link to an Internet service provider.

20. The apparatus of claim 18 wherein said data link comprises a link to a cellular phone service provider.

21. The apparatus of claim 17, wherein the localized data services module performs one or more services selected from the group consisting of personal navigation, vehicle navigation, localized marketing applications, localized services applications, fleet tracking, enhanced 911 services, telematics, localized advertisements for goods, localized advertisements for services, localized purchase incentives, and localized billing for phone services.

22. The apparatus of claim 21 wherein said received base station location information that has been corrupted comprises received base station location information that has been corrupted by cycle slip and multipath errors.

23. An article comprising a machine readable medium storing instructions that, if executed by a machine, cause the machine to perform a set of operations comprising:
storing a plurality of location information communications from a plurality of base stations received via a network;

monitoring the plurality of received location information communications and discarding any location information communications that have been corrupted;

selecting a subset of the non-discarded plurality of location information communications, wherein the subset is selected based at least in part on which of the plurality of base stations is utilizing a set of satellites that is also being utilized by a mobile device for which a correction information is being computed;

computing the correction information for the mobile device as a function of contents of the subset of said plurality of location information communications and known locations of said plurality of base stations; and stochastically integrating the subset of said plurality of location information communications to derive said correction information.

24. The article of claim 23 wherein the set of operations further comprises:

selecting said subset based on a location of said mobile device.

25. The article of claim 24 wherein the set of operations further comprises:

computing a second subset based on a precise location determined by a precise location computation;

computing a precise location as a function of said correction information and coarse location information determined by said mobile device.

26. The article of claim 24 wherein the set of operations further comprises:

providing location specific data based on a location computed using said correction information.

* * * * *